Figure 1:
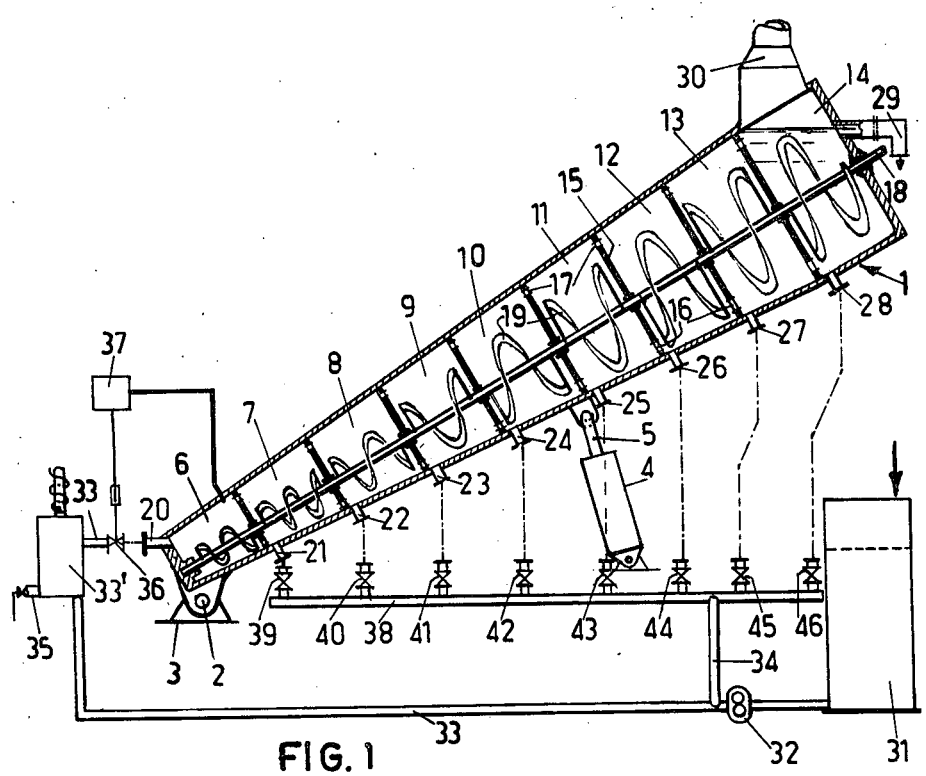

United States Patent [19]
de Vries et al.

[11] 3,932,142

[45] Jan. 13, 1976

[54] SERIAL FLOW CRYSTALLIZATION AT LINEARLY DECREASING PRESSURES

[75] Inventors: Gerbertus H. de Vries, Rotterdam, Netherlands; Gerrit C. de Bruyn, Antwerp, Belgium

[73] Assignees: Stork Werkspoor Sugar B.V., Hengelo; Suiker Unie Holding B.V., Rotterdam, both of Netherlands

[22] Filed: Nov. 1, 1972

[21] Appl. No.: 302,850

Related U.S. Application Data

[63] Continuation of Ser. No. 61,635, Aug. 6, 1970, abandoned.

[30] Foreign Application Priority Data

Sept. 26, 1969 Netherlands ...................... 6914625

[52] U.S. Cl. ...................... 23/301; 23/273; 156/622
[51] Int. Cl.² ........................................... B01D 9/02
[58] Field of Search .......... 23/273 R, 301 R, 312 S, 23/270 R; 62/58; 202/173

[56] References Cited
UNITED STATES PATENTS

| | | | |
|---|---|---|---|
| 1,738,275 | 12/1929 | Baker | 62/58 |
| 1,963,921 | 6/1934 | Nagelvoort | 23/312 S |
| 2,569,357 | 9/1951 | Vahl | 23/301 R |
| 2,587,556 | 2/1952 | Weiss et al. | 23/270 R |
| 2,778,717 | 1/1957 | Decker | 23/310 |
| 3,243,264 | 3/1966 | Hickey | 23/270 R |
| 3,337,419 | 8/1967 | Kogan | 202/173 |
| 3,440,026 | 4/1969 | DuBow | 23/312 S |
| 3,554,800 | 1/1971 | Javet et al. | 62/58 |

*Primary Examiner*—Norman Yudkoff
*Assistant Examiner*—S. J. Emery
*Attorney, Agent, or Firm*—John P. Snyder

[57] ABSTRACT

A process and apparatus for obtaining crystals of a particular substance from a flowing solution thereof, by supplying the seeding crystals to one $n^{th}$ portion of the saturated solution and supplying one $n^{th}$ portion of the solution to the crystalliser further downstream at each of $(n-1)$ places. The supersaturation of the solution is maintained at the required value by keeping the static pressure so low that self-vaporisation occurs, whereas this static pressure is caused to drop gradually in the crystalliser from its inlet end toward its discharge end.

5 Claims, 2 Drawing Figures

U.S. Patent  Jan. 13, 1976  3,932,142

INVENTOR
GERBERTUS H. DE VRIES
and
GERRIT C. DE BRUYN

BY

ATTORNEY

SERIAL FLOW CRYSTALLIZATION AT LINEARLY DECREASING PRESSURES

This application is a continuation of Ser. No. 61,635, filed Aug. 6, 1970, now abandoned, based upon Dutch application No. 69.14625, filed Sept. 26, 1969 and to which priority is claimed under 35 USC 119.

The invention relates to a process for continuously obtaining crystals of a particular substance from a continuously flowing solution thereof, by inspissating the solution in a concentrator to at least the saturated condition, adding seeding crystals to such saturated solution or allowing them to form therein, and converting the solution into the supersaturated condition and maintaining it therein, so that the crystals can grow to the required sizes. The prior art processes of the kind specified have the disadvantage that the initial rate of growth of the crystals is fairly high, whereafter it quickly decreases, so that the yield of the process is low in relation to the size of the apparatus. It is an object of the invention to provide a process ensuring a more uniform rate of crystal growth. To this end according to the invention the seeding crystals are supplied to or caused to develop in only a portion of the solution; such portion of the solution is converted into a supersaturated and homogeneously mixed condition and supplied to a crystalliser; and the remainer of the saturated solution is added to the first portion of the solution further downstream at one or more place in the crystalliser, a course of supersaturation being maintained in the crystalliser such that the crystals grow under optimum conditions. On condition that the supersaturation follows the correct course, the rate of crystal growth as the solution flows through the crystalliser can be made much more uniform.

Very conveniently according to the invention the seeding crystals are supplied to one $n^{th}$ portion of the saturated solution or are formed therein, and one $n^{th}$ portion of the solution is supplied to the crystalliser at each of $(n-1)$ places. A process of the kind specified enables a constant rate of crystal growth to be maintained throughout the whole crystalliser.

According to the invention the supersaturation of the solution is maintained at the required value by keeping the static pressure so low that self-vaporisation occurs, the static pressure being caused to drop gradually in the crystalliser from its inlet and towards its discharge end. Due to the vaporisation of the liquid, cooling occurs, so that the supersaturation is maintained, even though the dissolved substance is deposited from the solution in the form of the crystals. Moreover, the vaporisation makes inspissation more reliable, thus further contributing towards the maintaining of the supersaturation.

According to the invention a constant rate of crystal growth is automatically ensured by the fact that the static pressure is caused to decrease by making the solution flow upwardly through an oblong crystalliser whose longitudinal axis forms an angle with the horizontal plane, the absolute pressure at the bottom of the crystalliser being maintained at a predetermined value, all the fluid particles being caused to pass through each cross-section at a substantially equal speed. When the solution flows through the crystalliser, the static pressure gradually drops, so that self-vaporisation occurs. Optimum conditions of crystallisation are ensured by the constant addition of fresh saturated solution.

According to a possible feature of the invention the solution is inspissated to a predetermined concentration in the concentrator and maintained at a predetermined temperature, and the required degree of supersaturation is produced before entry into the crystalliser by the supplying of heat or the adding of non-inspissated solution, the degree of supersaturation and the minimum quantity of seeding crystals to be added being determined in dependence on the purity of the solution. Since the purity of the solution has a considerable influence on the conditions of crystallisation, it is very important that the degree of supersaturation and the quantity of seeding crystals are adapted to the purity of the solution at any particular moment, thus very effectively enabling the optimum conditions of crystallisation to be obtained.

The invention also relates to a crystalliser for the performance of one or more of the processes disclosed hereinbefore. The crystalliser has means for supplying saturated or substantially saturated solution, means for maintaining the supersaturation, and means for discharging the crystals formed, and according to the invention is subdivided into a number of portions which are connected in series and in which in addition to the first portion at least one subsequent portion has an extra supply connection for fresh saturated or substantially saturated solution, and each portion having an extra supply connection has a larger volume than the preceding portion, so that the residence time in all the portions is substantially identical during operation.

According to a possible feature of the invention each portion has means for intensively mixing the solution in such portion. This is a very simple way of ensuring that all the particles of the solution spend an identical time in any particular portion of the crystalliser.

According to another possible feature of the invention at least a portion of the crystalliser is constructed in the form of an oblong vessel whose longitudinal axis forms an angle with the horizontal plane and which has, at least, a supply connection for the saturated or substantially saturated solution adjacent its bottom end, a discharge connection for the vapour adjacent its top end, and a discharge connection for the saturated solution containing the crystals formed. If the crystalliser is constructed in this way, the static pressure of the solution flowing through the crystalliser gradually decreases in the direction of its end. The course of supersaturation can therefore readily be maintained at the required value by the fact that self-vaporisation occurs. Since each portion of the crystalliser has means for intensively mixing the solution therein, the temperature of the solution in any particular portion is in accordance with the absolute pressure at the top of such portion.

According to the invention the flow cross-section of the crystalliser can increase in the direction of flow. This is a very simple way of ensuring that the speed of flow of the solution in the cyrstalliser is constant. The flow cross-section can be increased by making the diameter of the vessel increase, or by using a conical core with a cylindrical vessel.

Figure 2:
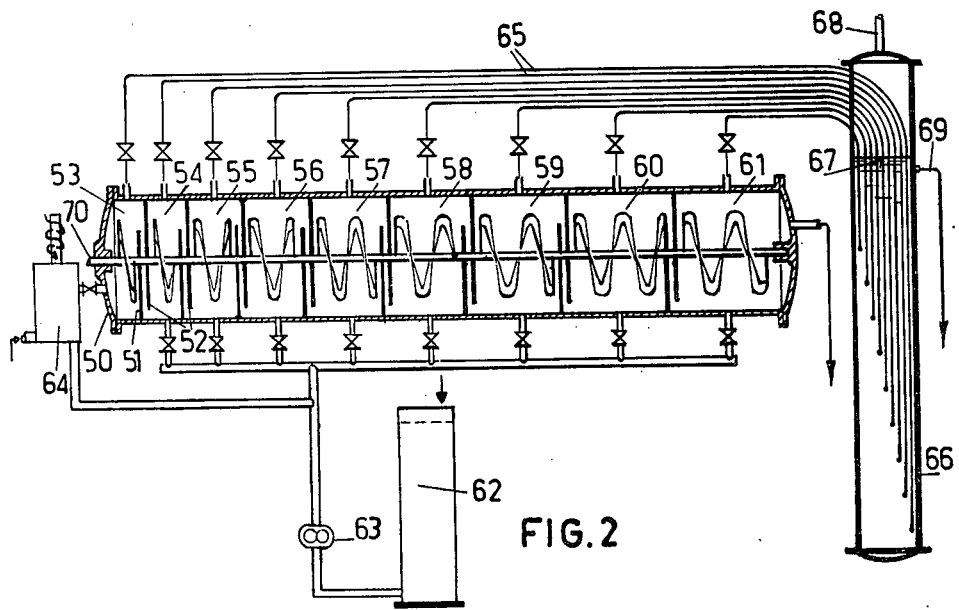

A number of embodiments of the invention will now be described in greater detail with reference to the drawings, wherein:

FIG. 1 shows a first embodiment of a crystalliser for the performance of the process according to the invention, and FIG. 2 shows a variant embodiment of a crystalliser for the performance of the process according to the invention.

The apparatus illustrated in FIG. 1 consists of a conical vessel 1 mounted at an angle to the horizontal plane. At its bottom end the vessel 1 is attached via the agency of a horizontal hinge 2 to a frame 3 (not shown in detail). The angle formed by the centre line of the vessel 1 with the horizontal plane can be adjusted via the agency of a hydraulic cylinder 4 which is pivotably attached to the frame 3 and whose piston rod 4 is hingeably attached to the vessel 1.

The crystalliser 1 is subdivided into chambers 6-14 separated from one another by partitions 15 formed with apertures 16, 17. A shaft 18 is mounted in the end walls of the crystalliser 1 and extends through the chambers 6-14 via the apertures in the partitions 15. Helically extending strips 19 are disposed on the shaft 18. When the shaft 18 is driven, the helically extending strips 19 exert an intensive agitating action on the liquid in each chamber. Each of the chambers 6-14 has a supply connection 20-28. The chamber 14 has a liquid discharge 29 and a vapour discharge 30.

Saturated solution coming from a vessel 31 is supplied by a pump 32 to pipes 33, 34. Pipe 33 has a mixing apparatus 33' which has an agitating mechanism and to which seeding crystals can be supplied via a pipe 35. The pipe 33 adjoins the supply connection 20 of chamber 6. The pipe 33 includes a cut-off valve 36 which can be operated by a regulator 37 reacting to the pressure in the chamber 6. Via a distributing pipe 38, the pipe 34 is connected to the supply connections 21-28 of the chambers 7-14. Cut-off valves 39-46 are included in the pipes extending to the chambers. The cut-off valves 39-46 can have means so to adjust such valves, in dependence on the position of the cut-off valve 36, that the solution supplied by the pump 32 is uniformly distributed via the supply connections 20-28 to the chambers 6-14.

In the embodiment illustrated, the saturated solution leaving the vessel 31 can have, for instance, a temperature of 95°C, corresponding to a vapour tension of 425 mm Hg. There can be a pressure of, for instance, 360 mm Hg in the mixing apparatus 33'. The seeding crystals are homogeneously distributed throughout the solution in the mixing apparatus 33', the supersaturation at the top of the mixing apparatus 33' possibly reaching a value of about 1.11 at a temperature of 91°C. In chamber 6 the pressure decreases by 30 mm Hg, so that the absolute pressure drops to 330 mm Hg. As a result of this drop in pressure, self-vaporistaion occurs, accompanied by a further concentration and cooling. The resulting increase in supersaturation is substantially cancelled out by the growth of the seeding crystals, which are still very small. The temperature associated with this pressure is 88.5°C. The drop of 30 mm Hg in pressure depends on the size of the crystalliser and the inclination thereof. For all the chambers the drop in pressure is identical, so that self-vaporisation and therefore a further concentration and cooling again occurs in each chamber. The supersaturation therefore also gradually increases. If the crystalliser has the correct conicity, the time taken to flow through each chamber remains identical, even though the quantity flowing increases. The result of the process disclosed hereinbefore is that the rate of crystal growth remains constant.

With the crystalliser illustrated, the differences in vapour pressure between the successive chambers are automatically adjusted, on condition that a constant initial pressure is maintained at the bottom of the chamber 6. By adjusting the duration of the process when using the crystalliser illustrated, the course of supersaturation can also be adjusted. The rate of crystal growth is adjusted to a predetermined value, the result being a self-regulating process affording great advantages. The following table shows how the boiling temperature changes and the supersaturation increases for a particular change in the absolute pressure over the successive chambers.

| Place | Absolute pressure in mm Hg | Boiling temperature in °C | Supersaturation |
| --- | --- | --- | --- |
| inlet to chamber 6 | 360 | 91.1 | 1.11 |
| at the top of chamber 6 | 330 | 88.5 | 1.11 |
| at the top of chamber 7 | 300 | 85.6 | 1.12 |
| at the top of chamber 8 | 270 | 82.7 | 1.13 |
| at the top of chamber 9 | 240 | 79.4 | 1.14 |
| at the top of chamber 10 | 210 | 75.9 | 1.15 |
| at the top of chamber 11 | 180 | 72.0 | 1.16 |
| at the top of chamber 12 | 150 | 67.5 | 1.175 |
| at the top of chamber 13 | 120 | 62.2 | 1.195 |
| at the top of chamber 14 | 90 | 55.9 | 1.22 |

Self-vaporisation is also used in the embodiment illustrated in FIG. 2. In this embodiment the required lowering of the pressure in the successive chambers is produced by artificial means.

In this embodiment the crystalliser is formed by a horizontal cylindrical vessel 50. The vessel 50 is subdivided into chambers by partitions 51, 52 disposed in pairs, the partitions 51 extending from the lower side and a partition 52 extending from the upper side, the partitions 51, 52 forming a liquid lock. The various chambers 53-61 are of increasing volume, so that an increasing quantity of solution flowing through the chambers has a constant dwell time therein. In the same way as that illustrated with reference to FIG. 1, an equal quantity of saturated solution is supplied from a vessel 62 by a pump 63 to all the chambers. In a mixing apparatus 64 seeding crystals are mixed with the saturated solution, which is supplied to the first chamber 53. In this embodiment each of the various chambers has its own vapour discharge 65. The vapour evolved in each chamber 53-61 is discharged via the associated discharge pipe 65, the pipes 65 discharging into a vessel 66 at a predetermined depth below the liquid level 67 therein. The vessel 66 is connected to a condenser at a place 68. The liquid level 67 is maintained via the agency of an overflow 69. Since each of the chambers disposed further to the right is connected to a pipe 65 whose end discharge further below the liquid level 67, the pressure in the successive chambers 53-61 decreases. In a similar way to that illustrated with reference to the embodiment shown in FIG. 1, the result is a self-vaporisation, the supersaturation increasing and the rate of crystal growth remaining as constant as possible. Just as in the embodiment illustrated in FIG. 1, the vessel 50 has a shaft 70 extending through all the chambers. The shaft 70 can be driven, and bears helically extending blades which make sure that the solution is intensively mixed in each chamber. If care is taken that the difference in level between the ends of the pipes 65 corresponds to a difference in pressure of 30 mm Hg. and other conditions are maintained, the same as in the embodiment illustrated in FIG. 1, it can be assumed that the above table also applies to the temperature, pressure and degree of supersaturation in the various chambers 53–61.

What we claim is:

1. A process for continuously obtaining crystals of a particular substance from a continuously flowing solution thereof, which comprises the steps of:
    a. providing a crystallizer having a number $n$ of stages which are in serial flow relation, there being an initial stage at one end of the crystallizer and a final stage at the opposite end thereof;
    b. continuously introducing equal volumes of at least saturated solution of said particular substance into each of said n stages with continuous stirring in each stage, the solution being at a predetermined pressure and a predetermined temperature;
    c. introducing seed crystals of said particular substance into that solution flowing into said initial stage and maintaining the pressure in said initial stage and in all the other stages at values less than said predetermined pressure so that supersaturated solution containing seed crystals flows from said initial stage serially through the remaining stages;
    d. maintaining the pressures in said n stages at linearly decreasing values from said initial stage to said final stage so that self evaporation occurs in each stage with continuous and substantially constant growth of said seed crystals from said initial through said final stage; and
    e. continuously withdrawing said solution with size-increased seed crystals from said final stage.

2. The method as defined in claim 1 wherein each stage is pressure-isolated from the others and the pressures in the different stages are step-wise adjusted to differ by equal amounts sequentially through the stages.

3. The method as defined in claim 2 wherein said stages are of progressively increasing lengths such that the residence time of solution in each stage is the same.

4. The method as defined in claim 1 wherein said stages are formed in an elongate vessel having its axis inclined at an acute angle with the horizontal whereby said linearly decreasing values of pressure are effected continuously from the lower to the upper end of the vessel.

5. The method according to claim 4, wherein said stages are of equal lengths but of progressively increasing volume such that the residence time of solution in each stage is the same.

* * * * *